(12) United States Patent
Prokhorov et al.

(10) Patent No.: US 8,379,981 B1
(45) Date of Patent: Feb. 19, 2013

(54) SEGMENTING SPATIOTEMPORAL DATA BASED ON USER GAZE DATA

(75) Inventors: Danil V. Prokhorov, Canton, MI (US); Matteo T. Mannino, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/219,251

(22) Filed: Aug. 26, 2011

(51) Int. Cl.
*G06K 9/34* (2006.01)

(52) U.S. Cl. .................................................. 382/173

(58) Field of Classification Search ................. None
See application file for complete search history.

(56) References Cited

U.S. PATENT DOCUMENTS

| | | | |
|---|---|---|---|
| 7,065,250 | B1 | 6/2006 | Lennon |
| 7,413,267 | B2 | 8/2008 | Katayama |
| 2002/0176604 | A1 | 11/2002 | Shekhar et al. |
| 2005/0018911 | A1 | 1/2005 | Deever |
| 2007/0104369 | A1 | 5/2007 | Weatherhead |
| 2008/0181452 | A1 | 7/2008 | Kwon et al. |
| 2009/0022368 | A1 | 1/2009 | Matsuoka et al. |
| 2009/0290753 | A1 | 11/2009 | Liu et al. |
| 2010/0036563 | A1 | 2/2010 | Inou et al. |
| 2010/0054526 | A1 | 3/2010 | Eckles |
| 2010/0104184 | A1 | 4/2010 | Bronstein et al. |
| 2010/0191459 | A1 | 7/2010 | Carter et al. |
| 2010/0226564 | A1 | 9/2010 | Marchesotti et al. |
| 2010/0253598 | A1 | 10/2010 | Szczerba et al. |

OTHER PUBLICATIONS

Sun et al., "EYEWATCHME—3D Hand and Object Tracking for Inside Out Activity Analysis," IEEE Computer Society on Computer Vision and Pattern Recognition Workshops, 2009, 8 pages.

Sangin et al., "How Learners Use Awareness Cues About Their Peer's Knowledge? Insights from Synchronized Eye-Tracking Data," 8 pages.

Malik et al., "Fusion of in-vehicle sensor data to develop intelligent driver training system (IDTS)," Queensland University of Technology, Paper No. 09-0048, 9 pages.

Fletcher et al., "Vision in and out of Vehicles," IEEE Intelligent Systems, 2003, pp. 12-17.

Doshi et al, "Investigating the Relationships Between Gaze Patterns, Dynamic Vehicle Surround Analysis, and Driver Intentions," IEEE Intelligent Vehicles Symposium, 2009, pp. 887-892.

Chernyak et al., "Sequential Knowledge-Driven Scene Recognition Model," IEEE Computer Society Conference on Computer Vision and Pattern Recognition, vol. 2, 2001, pp. 382-387.

(Continued)

*Primary Examiner* — Bhavesh Mehta
*Assistant Examiner* — Nirav G Patel
(74) *Attorney, Agent, or Firm* — Oblon, Spivak, McClelland, Maier & Neustadt, L.L.P.

(57) ABSTRACT

A segmentation task is specified to a user, and gaze data generated by monitoring eye movements of the user viewing spatiotemporal data as a plurality of frames is received. The gaze data includes fixation locations based on the user's gaze throughout the frames. A first frame and a second frame of the frames are selected based on the fixation locations. Segmentation is performed on the first and second frames to segment first and second objects, respectively, from the first and second frames based on a region of interest associated with the first and second frames, the region of interest corresponding to a location of one of the fixation locations. A determination is made as to whether the first and second objects are relevant to the segmentation task, and if so, association data to associate the first object with the second object when the first and second objects is generated.

16 Claims, 15 Drawing Sheets

OTHER PUBLICATIONS

Ding et al., "Two-layer generative models for sport video mining," IEEE International Conference on Multimedia and Expo, ICME 2007, Jul. 2007, 4 pages.

Liang et al., "Content-base Image Retrieval Using a Combination of Visual Features and Eye Tracking Data," ETRA 2010, pp. 41-44.
Takemura et al., "Estimating 3D Point-of-regard and Visualizing Gaze Trajectories under Natural Head Movements," ETRA 2010, pp. 157-160.

US 8,379,981 B1

SEGMENTING SPATIOTEMPORAL DATA BASED ON USER GAZE DATA

BACKGROUND

This application relates to segmenting spatiotemporal data, including video data or lidar data, using gaze data obtained through monitoring a user's gaze of the spatiotemporal data.

The "background" description provided herein is for the purpose of generally presenting the context of the disclosure. Work described herein, to the extent it is described in this background section, as well as aspects of the description which may not otherwise qualify as prior art at the time of filing, are neither expressly or impliedly admitted as prior art.

Segmentation of video data generally involves segmenting frames of the video data individually, i.e., on a frame-by-frame basis. This process involves dividing the pixels of an individual frame into segments in order to identify objects within the frame and boundaries of those objects. Generally, this process involves steps performed by a computer and a user.

In one process, e.g., an individual frame is input into an object detector of a computer, and analyzed extensively to identify all objects within the individual frame. Thereafter, a user reviews the objects identified by the objection detector and corrects misidentifications. This process is repeated for each frame of the video data.

In another process of segmentation, a user is required to manually identify objects in key frames of a video sequence. In this process, a user views an individual frame of the video and creates control points along the boundaries of the object. The user then inputs parameters which identify the object as static or moving and which are used to adjust a location of the defined boundaries in proceeding frames. Thereafter, a user may edit key frames of the video to adjust the location and size of the boundaries. A computer algorithm then uses an interpolation process to identify the position and shape of the object within the frames that have not been directly viewed and edited.

SUMMARY

This disclosure addresses various problems associated with known segmentation processes which the inventors have discovered. In particular, in the process involving object detectors, detailed segmentation is very time-consuming. For example, in order for an object detector to identify objects within a frame, all areas of the frame must be analyzed, which is a computationally intensive process. In addition, when the frames include many objects, the process can require even more computer resources. Moreover, an object detector may incorrectly identify objects within the frame based on an object recognition algorithm used to perform the object detection. This results in an increase in the amount of time a user must spend to correct these misidentifications.

Even in a process which is based on identification of objects in key frames, a user is still required to view the frames and input parameters. Consequently, this process is very time-consuming.

This disclosure is directed to segmenting spatiotemporal data (e.g., video data or lidar data) with the use of user gaze data, so that segmentation can be performed with less computational resources than known processes. That is, by using user gaze data, segmentation can be performed on regions within frames of the spatiotemporal data which correspond to locations where the user has a momentarily fixated gaze. This results in segmentation being quickly performed because segmentation is limited to specified regions of the frames.

One embodiment relates to determining whether objects are relevant to a task specified to a user viewing the spatiotemporal frames. Such tasks include identifying a user as a driver or passenger or a vehicle. By associating objects with a task, a relationship is established for these objects.

According to aspects of this disclosure, a segmentation task is specified to a user, and gaze data generated by monitoring eye movements of the user viewing spatiotemporal data as a plurality of frames is received. The gaze data includes fixation locations based on the user's gaze throughout the frames. A first frame and a second frame of the frames are selected based on the fixation locations. Segmentation is performed on the first and second frames to segment first and second objects, respectively, from the first and second frames based on a region of interest associated with the first and second frames, the region of interest corresponding to a location of one of the fixation locations. A determination is made as to whether the first and second objects are relevant to the segmentation task, and if so, association data is generated to associate the first object with the second object when the first and second objects are relevant.

The foregoing paragraphs have been provided by way of general introduction, and are not intended to limit the scope of the following claims. The described embodiments, together with further advantages, will be best understood by reference to the following detailed description taken in conjunctions with the accompanying drawings.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 22 illustrates a procedure for determining whether segments or objects are similar.

DETAILED DESCRIPTION

Figure 1:
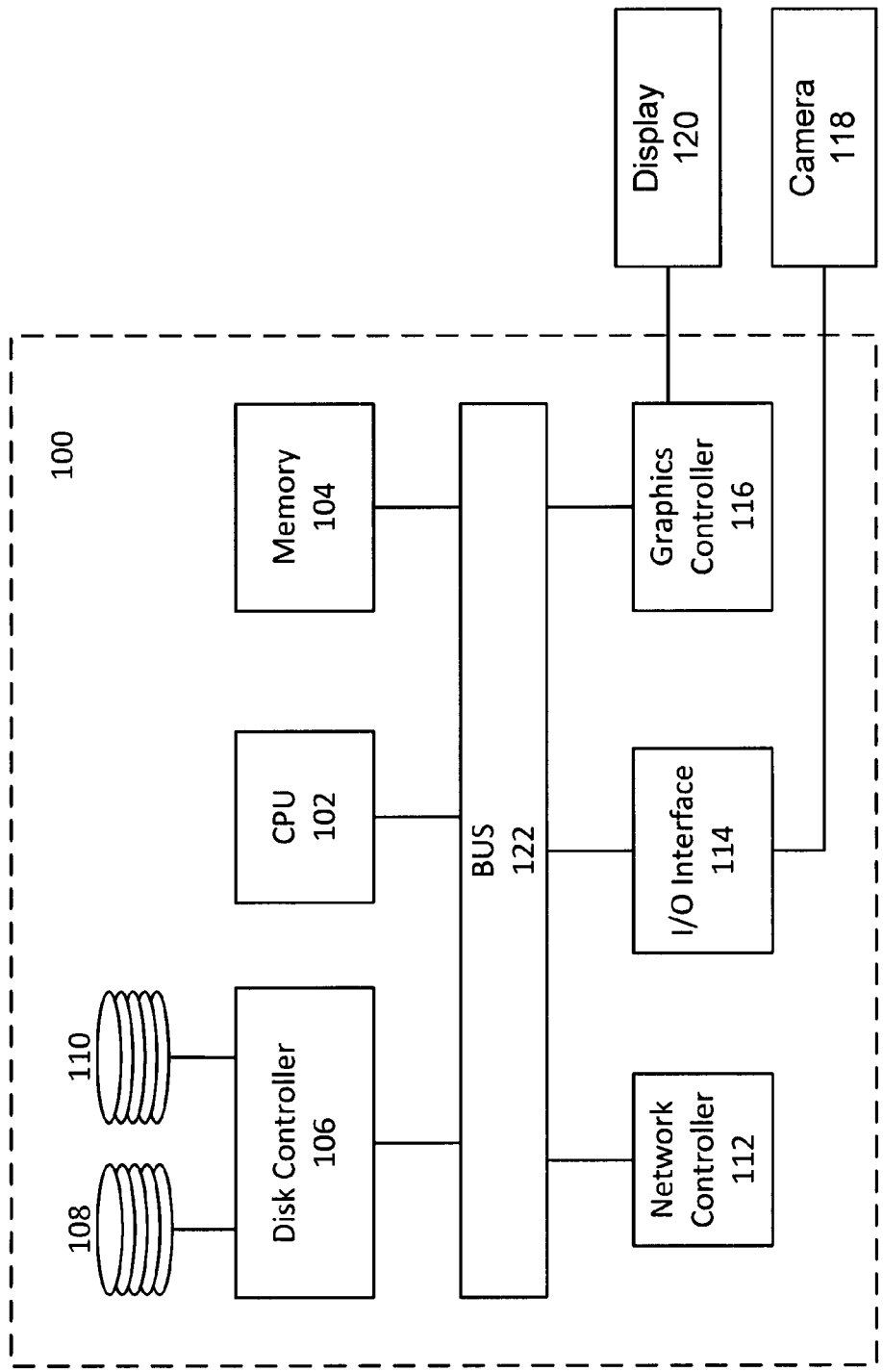
FIG. 1 is a block diagram showing hardware components of a segmentation system.

In the drawings, reference numerals designate identical or corresponding parts throughout the several views. FIG. 1 shows an exemplary structure for a segmentation system 100. The segmentation system 100 includes computer hardware components that are either individually programmed or execute program code stored on various recording media. In an exemplary embodiment, the segmentation system 100 includes a central processing unit (CPU) 102, memory 104, a disk controller 106 controlling operations of a hard disk drive 108 and/or an optical disk drive 110, a network controller 112, in I/O interface 114 and a graphics controller 116. The I/O interface is connected to a camera 118, and the graphics controller 116 is connected to a display 120. In some implementations, the camera 118 is a component of the display 120, and may share a communication/data channel with the display 120. In some implementations, the I/O interface is further connected to user-input peripherals such as touch-screen monitor controller, a keyboard and a mouse. Further, the controllers shown in FIG. 1 share a common BUS 122 for transferring data, and the controllers may include application specific integrated controllers and other programmable components.

The network controller allows the segmentation system 100 to communicate via a network, such as the Internet. In some aspects, the camera 118 and/or the display 120 are coupled to the segmentation system 100 via a network.

Figure 2:
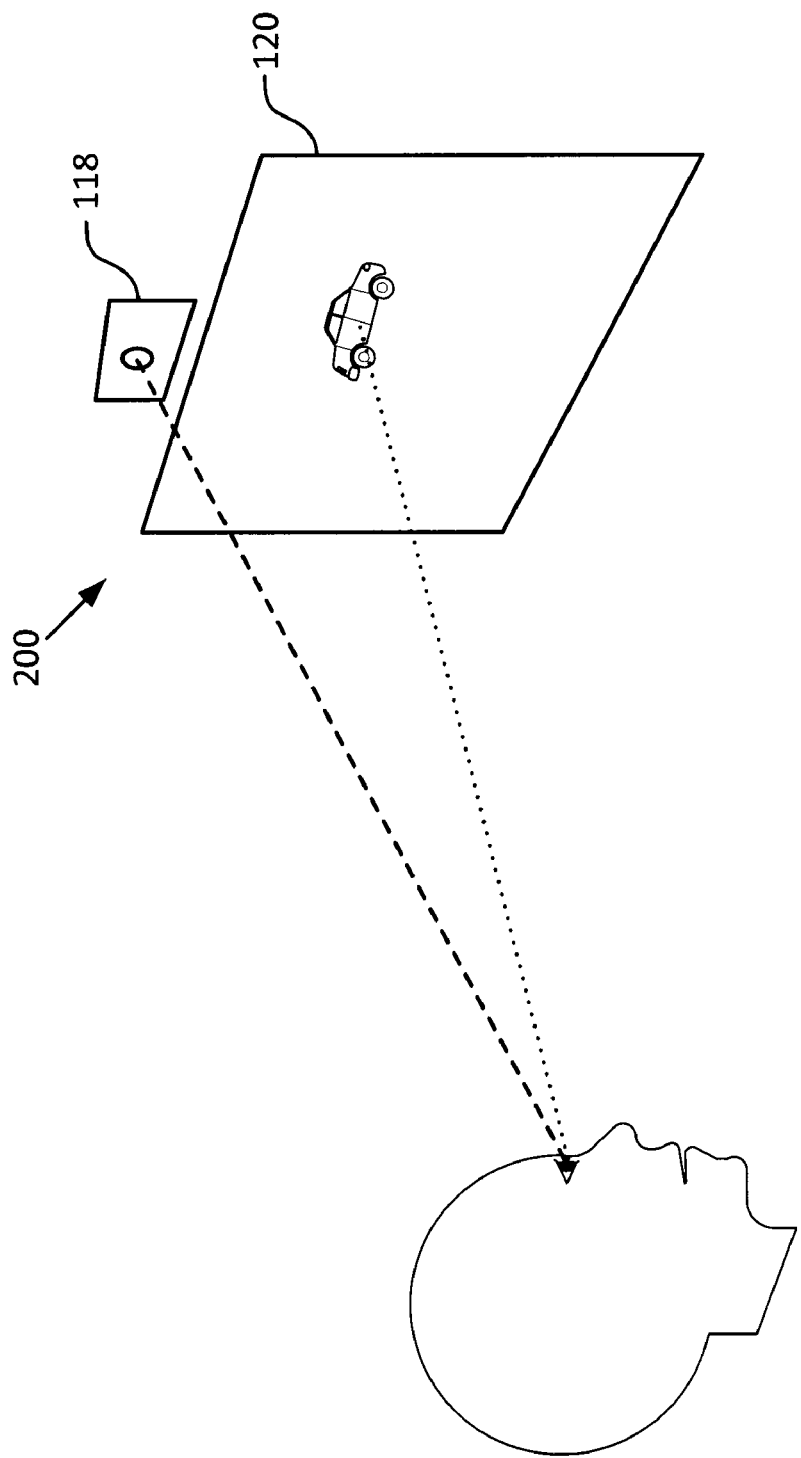
FIG. 2 shows an eye tracking device.

FIG. 2 illustrates a gaze-tracking device 200, including the camera 118 and the display 120. The camera, coupled to a segmentation system such as the segmentation system 100, captures gaze data by tracking eye movements of a user relative to the display 120. The gaze tracking device 200 monitors and records a user's gaze while the user views spatiotemporal data (e.g., video data, lidar data) displayed as a plurality of frames on the display 120. The gaze tracking device 200 may be configured to monitor the user's eye movements, head movements, or a combination of both.

The examples discussed below are discussed relative to video data. However, it should also be appreciated that other spatiotemporal data may be used, such as, lidar data, heat map data, infrared data or other data generated through a time-of-flight type sensor.

Figure 3:
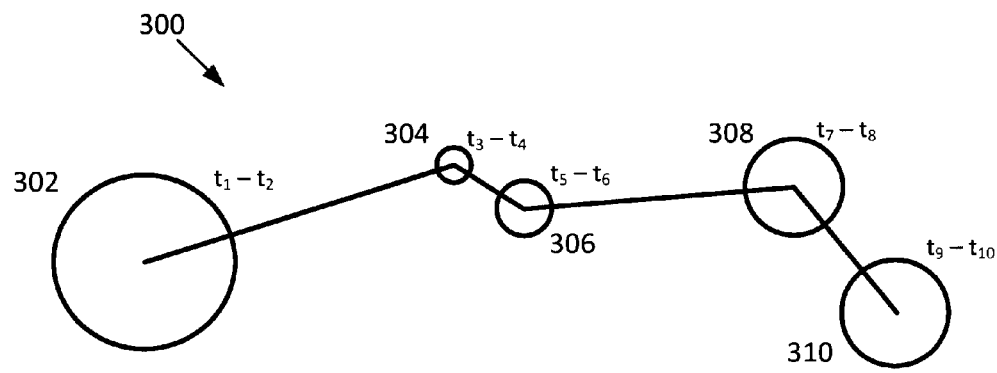
FIG. 3 shows an exemplary visual scan path of a user.

FIG. 3 shows a representation of gaze data 300 recorded by the gaze tracking device 200. This gaze data represents a visual scan path of the user's gaze on a display, and includes fixation locations where the user's gaze momentarily fixates. This gaze data can be represented as coordinate values (e.g., x and y) and time data. For example, a fixation location 302 represents a location of the user's gaze between times $t_1$ and $t_2$. Similarly, the fixation locations 304, 306, 308 and 310 represent locations of the user's gaze between times $t_3$ and $t_4$, $t_5$ and $t_6$, $t_7$ and $t_8$, and $t_9$ and $t_{10}$, respectively.

In general, a user's gaze is directed to an area on a display screen, as opposed to a discrete coordinate. Accordingly, in an exemplary aspect, a fixation location is defined as an area and the corresponding coordinate values that define that area. As shown in FIG. 3, the fixation location 302 is defined by a circular area. However, it should be appreciated other geometric shapes can be used, such as squares, rectangles, triangles, and ellipses. Further, the area of the fixation location can decrease in size as the user's gaze focuses on a specific location over an extended period of time. That is, taking the exemplary representation in FIG. 3, fixation location 302 can be indicative of $t_1$-$t_2$ being relatively short, whereas fixation location 304 can be indicative of $t_3$-$t_4$ being relatively long.

Figure 4:
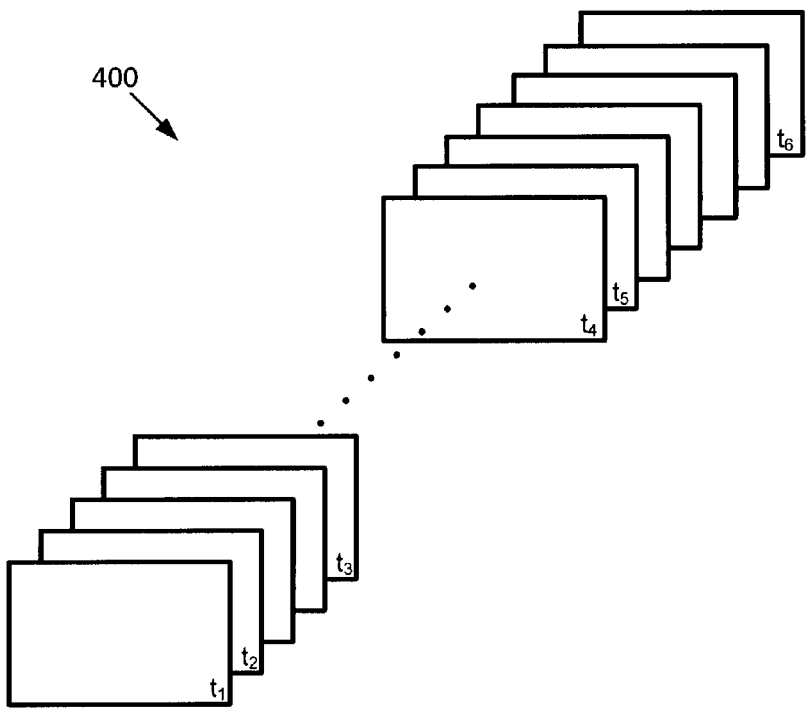
FIG. 4 shows exemplary frames of spatiotemporal data.

FIG. 4 illustrates a plurality of spatiotemporal frames and an association with corresponding fixation locations. In one example, two frames shown between times $t_1$ and $t_2$ are associated with the fixation location 302. However, it should be appreciated FIG. 4 shows frames primarily for representative purposes. That is, if the frames are frames of video data running at, e.g., 24 fps (frames per second), then each of the frames shown in FIG. 4 could represent 12 frames of video data.

Figure 5:
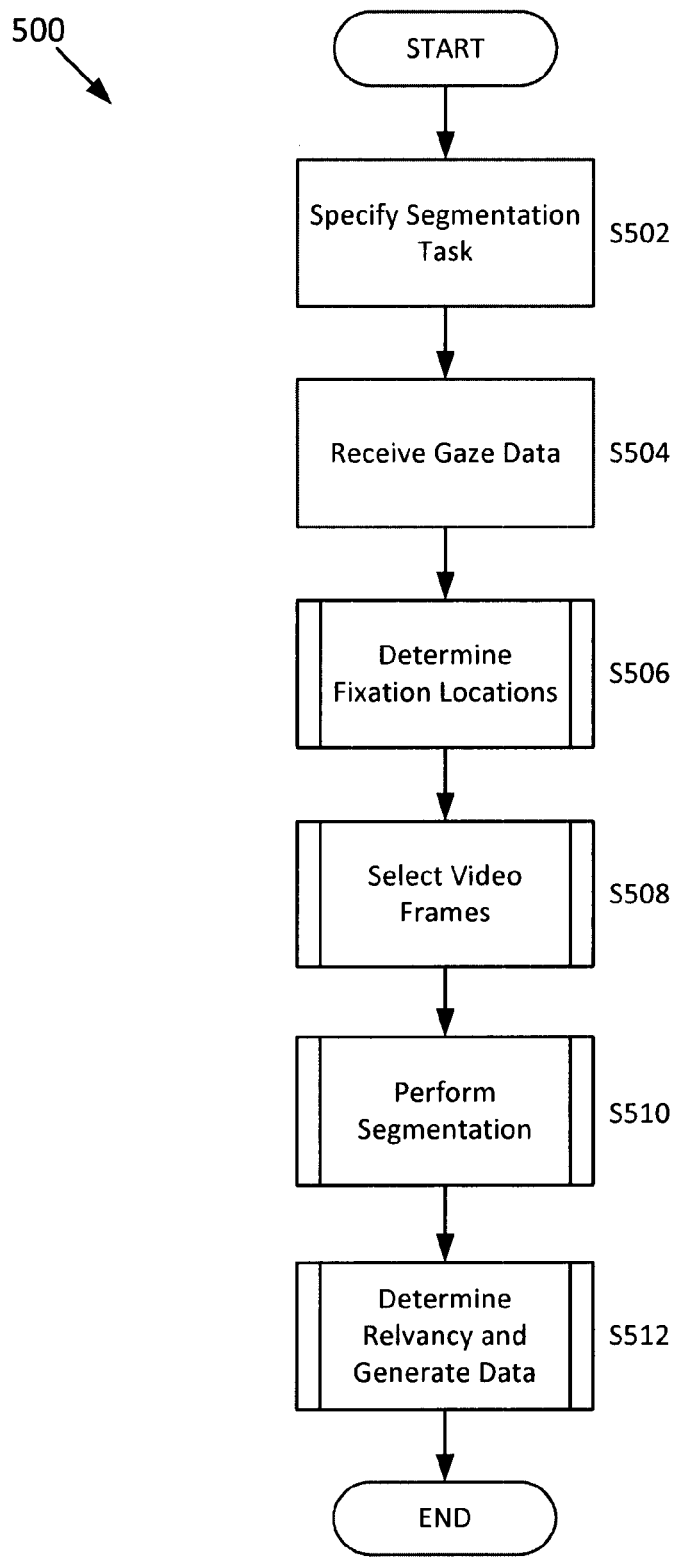
FIG. 5 is a flowchart of a segmentation and association algorithm according to one embodiment.

FIG. 5 illustrates an algorithmic process, by way of a flowchart, for segmenting spatiotemporal data. This process includes specifying a segmentation task at S502, receiving gaze data at S504, determining fixation locations at S506, selecting video frames at S508, performing segmentation at S510, and determining relevancy and generating association data at S512.

As S502, a user is specified a segmentation task before the user begins to view the spatiotemporal data, such as video images, on a display screen. The user is given direction as to the objects he/she should be paying attention to while viewing the spatiotemporal data or the user is instructed to act as a driver or passenger of a vehicle. Accordingly, the user's gaze will be directed to objects relevant to the segmentation task, e.g., the driver or passenger.

In the following examples, spatiotemporal data represents a driving video and the user is specified the task of a driver of a passenger car having the objective of driving safely. However, other segmentations tasks may be equally applied, such as, cycling, being a passenger in a vehicle, operating a commercial vehicle, or operating a construction vehicle. For the task of being a driver of a passenger car, the user directs his gaze to objects which are relevant to safe driving, such as other vehicles, pedestrians, road lines, traffic lights/signals, signs, etc. Other objects may be categorized or determined as not relevant to a task of safe driving.

The process of specifying a segmentation task to a user at S502 may include displaying the segmentation task on a display screen or a list of segmentation tasks on the display screen for a user to select from. The user may also identify the segmentation task or be identified by the segmentation system 100 by vocal instructions or audio reproduction.

Once the segmentation task has been specified, the segmentation system 100 receives gaze data at S504. As discussed above, the gaze data may be the result of an eye-tracking camera, such as camera 118. The gaze data may also be received from a network device or a recording medium. The segmentation system 100 may receive the gaze data as the data is being generated or from a device or medium which has the data previously recorded.

Figure 6:
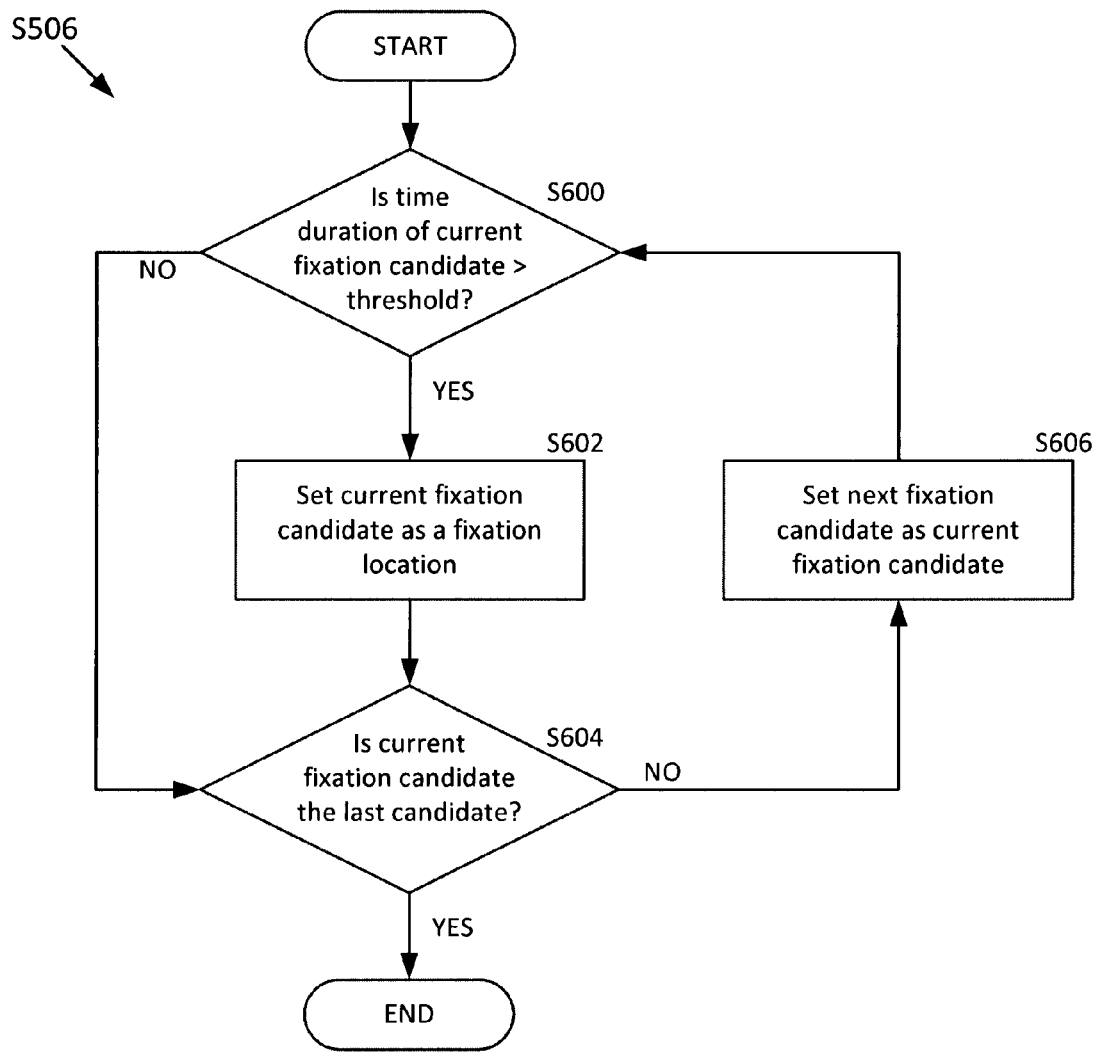
FIG. 6 is a flowchart of an algorithm for determining fixation locations.

As S506, fixation locations are determined. This process is explained by way of the flowchart shown in FIG. 6. A time duration is determined for a current fixation candidate, which is a candidate for a fixation location. If the time duration for that candidate is determined to exceed a threshold time duration at S600, then the candidate is set as a fixation location at S602. If that candidate is determined to be the last candidate S604, then the process ends. Otherwise, a next fixation candidate is set as a current candidate at S606 and the process starting at S600 is repeated. When the time duration threshold is not satisfied, the process skips S602 and proceeds to S604, and process S506 is repeated until all candidates are processed.

As discussed above, gaze data includes fixation locations where the user has momentarily fixated his gaze. Associated with such a fixation location is duration data indicating a time duration of the user's gaze at the fixation location. It should be appreciated that a user's gaze does not always follow a continuous path from one location to the next. Often, a user's gaze fluctuates to another location on a display for a fraction of a second. In such a situation, a fixation location would be generated even though the duration data would indicate a very short time duration.

In one aspect of this disclosure, in order to address such a situation, all fixation locations are defined as fixation location candidates, and the duration data of each fixation location candidate is compared to a predetermined threshold, as discussed above at S600. This predetermined threshold can be, e.g., 1/10 of a second or 2 frames when 24 fps video is used. As such, fixation location candidates which represent inadvertent gaze locations of a user are not used. However, it should also be appreciated the process of determining fixation locations at S506 may be omitted in part or altered so that all fixation location candidates may be set as fixation locations.

Figure 7:
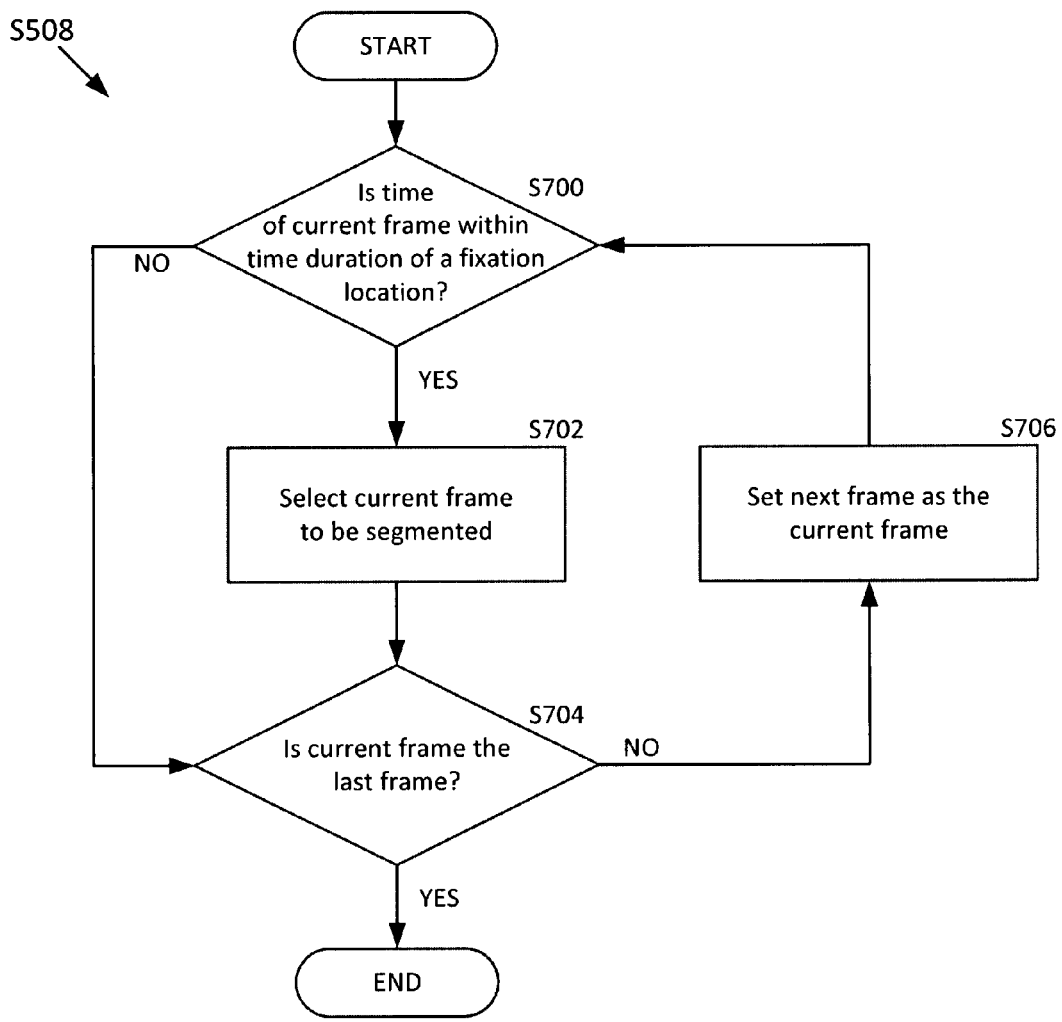
FIG. 7 is a flowchart of an algorithm for selecting video frames.

FIG. 7 shows the process for selecting frames of spatiotemporal data at S508. At S700, a determination is made as to whether a time of a current frame is within a time duration of a fixation location. If so, the current frame is selected to be segmented at S702, and a determination is made as to whether the current frame is the last frame at S704. If not, a next frame is selected as the current frame at S706, and the process returns to S700. When the time of the current frame is not within the time duration of a fixation location at S700, the process skips S702 and proceeds to S704, and process S508 is repeated until all frames are processed. Although not shown, process S508 can skip frames on a periodic basis to simplify processing requirements. For example, when the spatiotemporal data is video data captured at a high frame rate, it may not be necessary to process every frame individually, and only every other or every fourth frame need to be processed. Further, the process S508 can be adapted to only select one or two frames for each fixation location, and skip ahead to frames corresponding to a next fixation location.

In general, a frame of spatiotemporal data is associated with a time indicating a display time of the frame on a display. In addition, as discussed above, duration data is associated with a fixation location. In one aspect, when the time of a frame is determined to be within the time duration of a fixation location, that frame is selected as a frame to be segmented.

Figure 8:
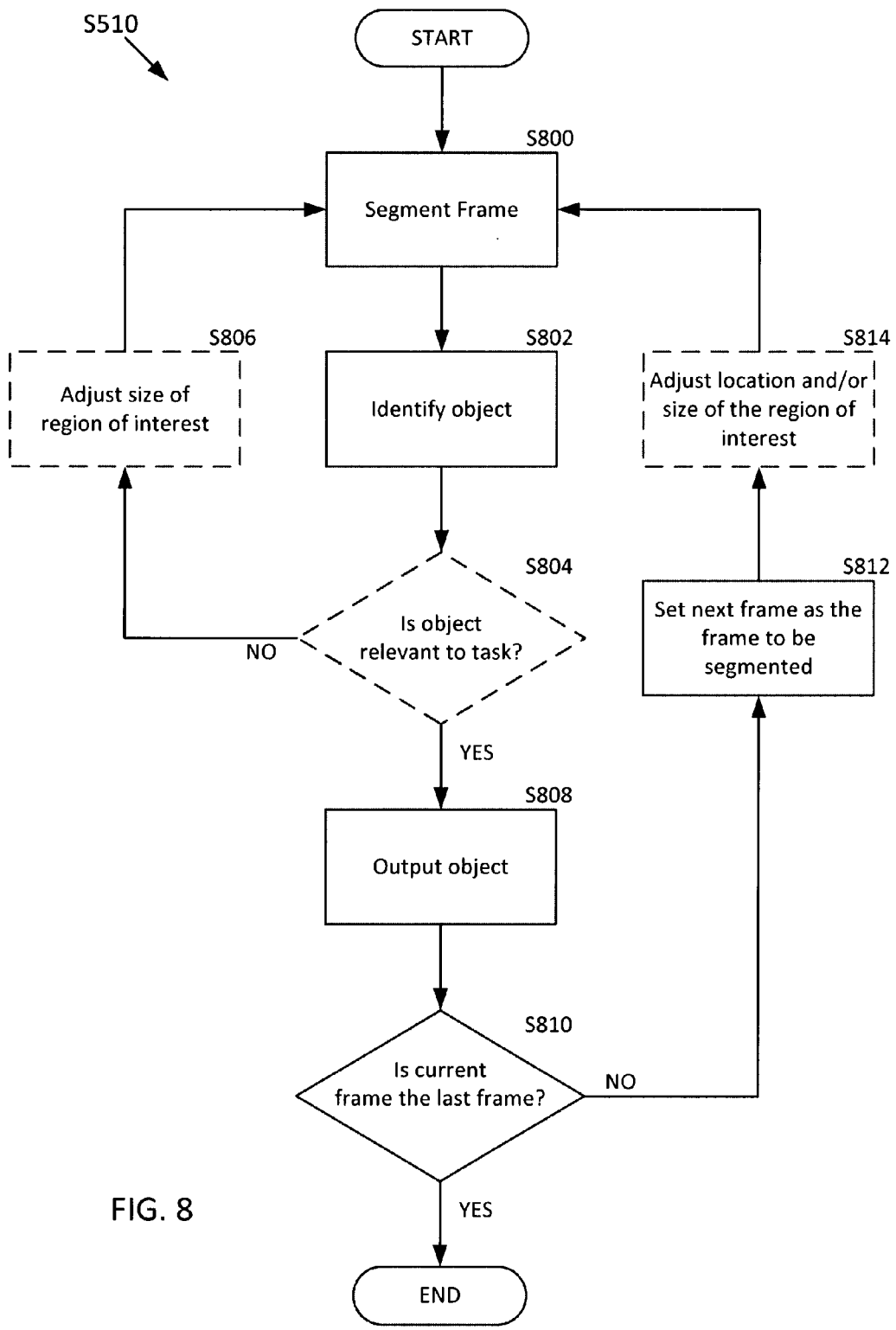
FIG. 8 is a flowchart of an algorithm for performing segmentation.

FIG. 8 illustrates the process of performing segmentation at S510. Initially, at S800, a frame selected in S508 is segmented. The frame is segmented the frame based on a region of interest associated with the frame. In other words, the region of interest is used to identify an area of the frame to be segmented. This region of interest represents a region corresponding in location to a location of one of the fixation locations. For example, as shown in FIG. 10A, the region of interest represents a region surrounding the fixation location, and is substantially centered on the fixation location. As discussed later, the size and location of the region of interest may be adjusted such that different areas of the frame will be segmented. The segmenting at S800 is performed to segment (e.g., to identify, detect and extract) an object located within the region of interest.

The segmenting at S800 may include segmenting only the area within the region of interest. As such, objects located within the region of interest will be segmented and objects located outside the region of interest will not be segmented.

In an exemplary aspect, the segmenting at S800 is followed by or includes analyzing features of the object to identify a type or class of the object at S802. The type or class of the object can be identified by comparing features of the object to features previously recorded as associated with an object. Such comparison can be performed by comparing a histogram, discussed below, of the object with histograms previously recorded in association with objects. When the type or class of the object is identified, the object is labeled (e.g., tagged or marked) as the identified type or class. This data can be output along with location data of the segmented object.

In one aspect, segmenting includes detecting an object located within the region of interest with an object detector or tracker. The object detector receives location and size parameters of the region of interest, and detects an object or objects located within the region of interest. In this example, the object detector can detect objects of a frame at a specified location and area defined by the parameters. The object detector may output location data and type or class data of the segmented object. Accordingly, by focusing the object detector on a specified location, an amount of time required to segment a frame and identify an object is reduced.

The above described object detector implements object detection by use of an object recognition algorithm. Such an algorithm receives feature based inputs such as, Histogram of Oriented Gradients (HOG) features, Speeded up Robust Features (SURF), and wavelet based features. The recognition algorithm can be implemented as Support Vector Machines (SVM), tree based classifier, and neural networks.

After the frame has been segmented, the process may proceed to S804 to determine whether the object or objects are relevant to the segmentation task which was previously specified to the user at S502. At S804, a determination is made as to whether the identified type or class of the segmented object is a predetermined type or class associated with the segmentation task. This generally includes comparing the type or class of the segmented object identified in S802, with the predetermined type or class associated with the segmentation task that was specified to the user at S502.

In the example of safe driving, the segmentation system 100 determines whether the identified type or class of the segmented object is relevant to the task of safe driving. An object type or class relevant to safe driving could be, for example, a vehicle, a pedestrian, a road line, a traffic light, a sign, etc. In other words, when the type or class of the segmented object is identified as a pedestrian, the object would be determined as relevant to the task of safe driving.

If it is determined that the object is not relevant to the segmentation task at S804, then the process may proceed to S806 which adjusts the size of the region of interest. The size of the region of interest can be adjusted to be larger or smaller in area, to include or exclude objects.

In one aspect, if an object is detected which is not relevant to the segmentation task, then the area of the region of interest may be increased, such that an object located outside the previous area of the region of interest may be segmented when the process returns to S800. The parameters for adjusting the size of the region of interest can be set in advance by a user or otherwise recorded within the segmentation system 100. Also, when the frame segmentation at S800 does not result in segmenting an object, the size of the region of interest may be increased at S806, such that segmentation can be repeated at S800. If still unsuccessful in segmenting an object, the process can proceed to a next frame or terminate.

At S808, an object which is determined to be relevant to a task, if such determination is utilized, or an object segmented at S800 and identified at S802 is output to be utilized by process at S512, which is discussed later. Then, at S810, a determination is made as to whether the currently segmented frame is a last frame to be segmented. If so, then the process ends. Otherwise, a next frame is set to be the frame to be segmented at S812. The location of the region of interest and the size of the region of interest may be adjusted at S814 based on an object previously identified and output for a frame prior to the now current frame to be segment. Then, the process returns to S800 for frame segmentation.

The relevancy of an identified object to a segmentation task was discussed above as being determined at S802. Another relevancy is determined in S512, which is a process of determining relevancy and generating association data.

Figure 9:
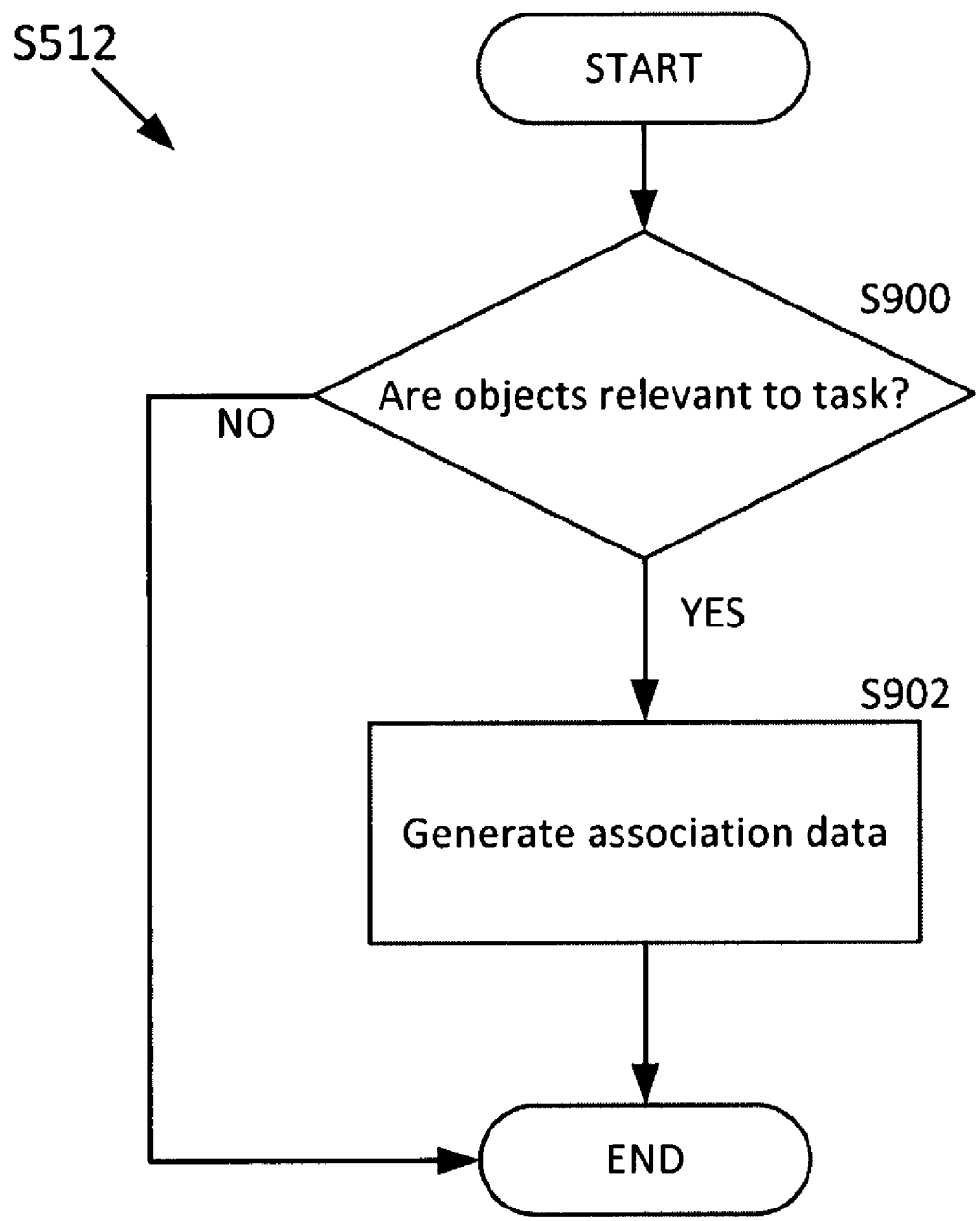
FIG. 9 is a flowchart of an algorithm for determining relevancy of objects and generating association data.

FIG. 9 shows the process S512 for determining the relevancy of the objects and generating association data. At S900, a determination is made as to whether the objects output at S808 are relevant to the segmentation task specified to the user at S502. This determination may be omitted if already provided in S804 of the process S510 shown in FIG. 8.

At S900, the determining of whether the identified type or class of the segmented object is a predetermined type or class associated with the segmentation task may be preformed for each object individually, two or more objects at a time, or all objects simultaneously. As such, S900 may be performed on a frame-by-frame basis or on multiple frames at one time.

When it is determined that an object or objects are relevant to the segmentation task at S900, the process proceeds to generate association data at S902, which indicates the objects are relevant to the segmentation task. The association data may generally indicate that an object segmented in a frame is associated with the segmentation task.

The association data generated at S902 may also indicate objects segmented from a first frame and a second frame are associated. For example, in the case of safe driving, a car segmented from a first frame may be associated with a car segmented from a second frame. The association data may indicate that the cars are the same car or cars on the same road.

When the objects are identified as the same object, the association data may also indicate a temporal action associated with the object, such as, a movement of a car from a first position to a second position. In such a case, the association data includes locations of the first position and the second position. Other temporal actions may include cars changing lanes, cars pulling out into the street from a parked position, pedestrians making sudden trajectory changes (e.g., jumping off the sidewalk and sprinting across the street), or stop light changes. By generating association data to associate objects segments from different frames, a relationship may be formed between these objects which is stored as the association data.

A temporal action may be recognized with the use of tracking and temporal recognition algorithms, including recurrent neural networks, temporal-random forests, Kalman filter (KF) trackers, conditional density propagation, and temporal Bayesian predictors. It should also be appreciated association data may be generated to associate an object or objects segmented from more than two frames. Additionally, more than one object can be segmented from an individual frame and association data generated to associate those objects with the segmentation task and/or each other.

Examples of segmenting frames within a region of interest are discussed below, referring to FIGS. 10-21. Generally, the area of the region of interest is larger than the area of the fixation location. In one aspect, the region of interest is defined by user parameters set in advance. For example, the user may set parameters, such as, width, length, radius, etc. depending on region of interest shape/geometry. In other aspects, the region of interest is defined by a function of distance to the object known either from stereo information, range finding, output of the object detector (as noted in the text accompanying FIGS. 18-19: a size of the region is reduced due to the recognition of the tree), or prior processing of the spatiotemporal data with map information.

Figure 10:
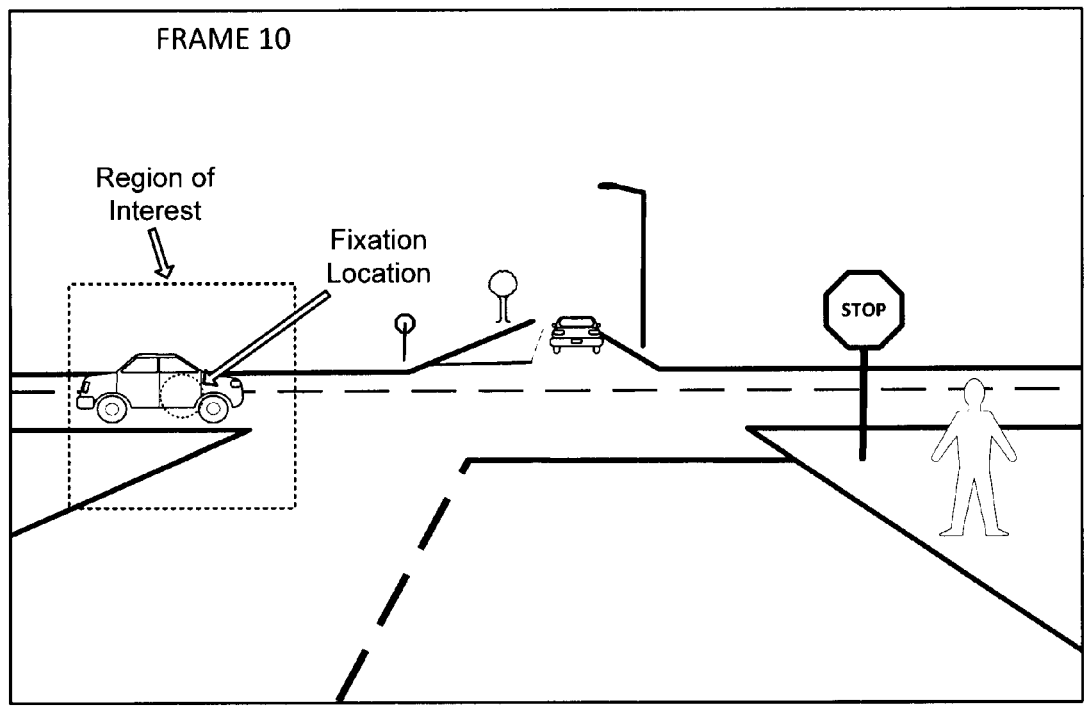
FIGS. 10-11 illustrate a first example of performing segmentation at a traffic intersection.
Figure 11:
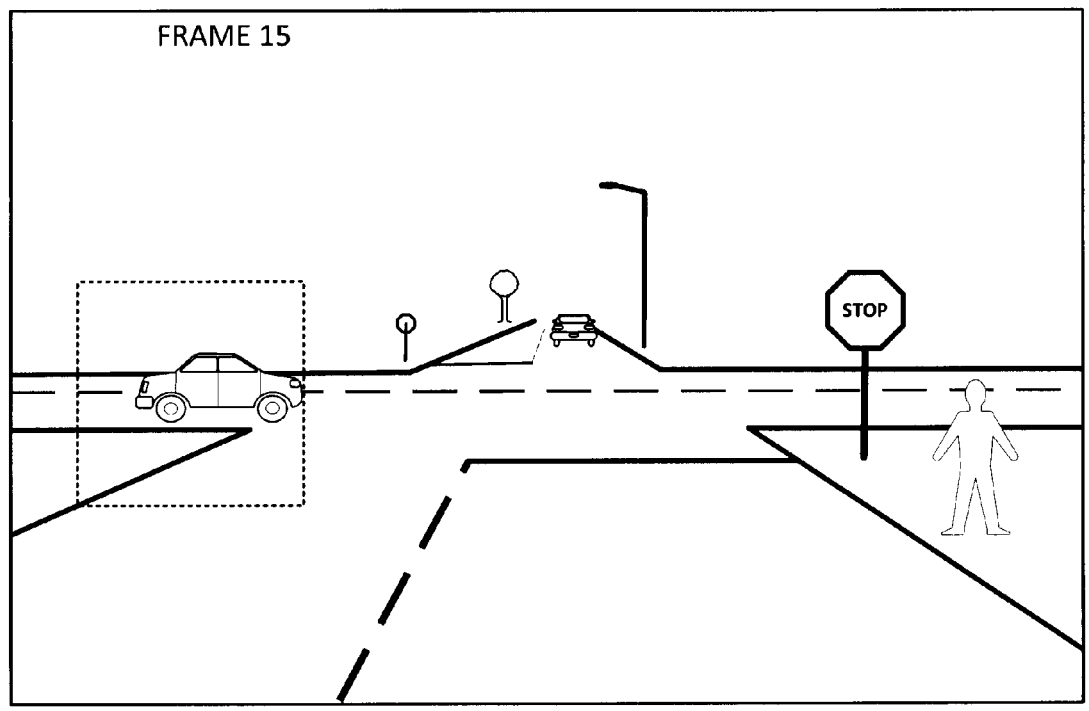
Figure 12:
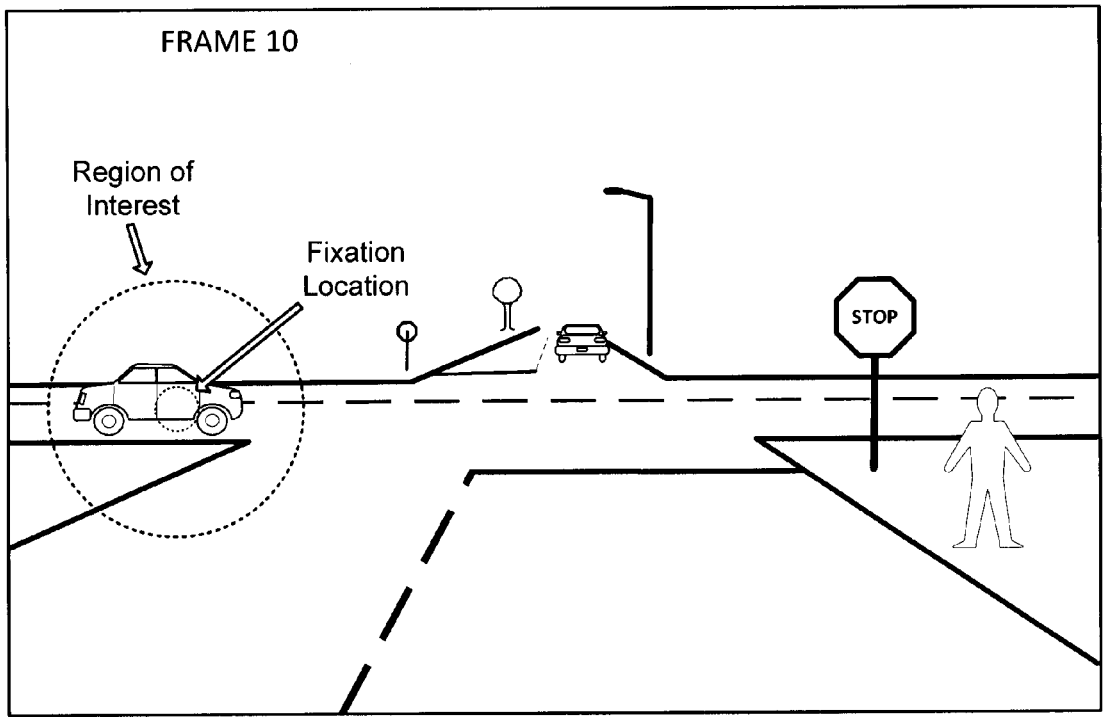
FIGS. 12-13 illustrate exemplary regions of interest used in segmentation
Figure 13:
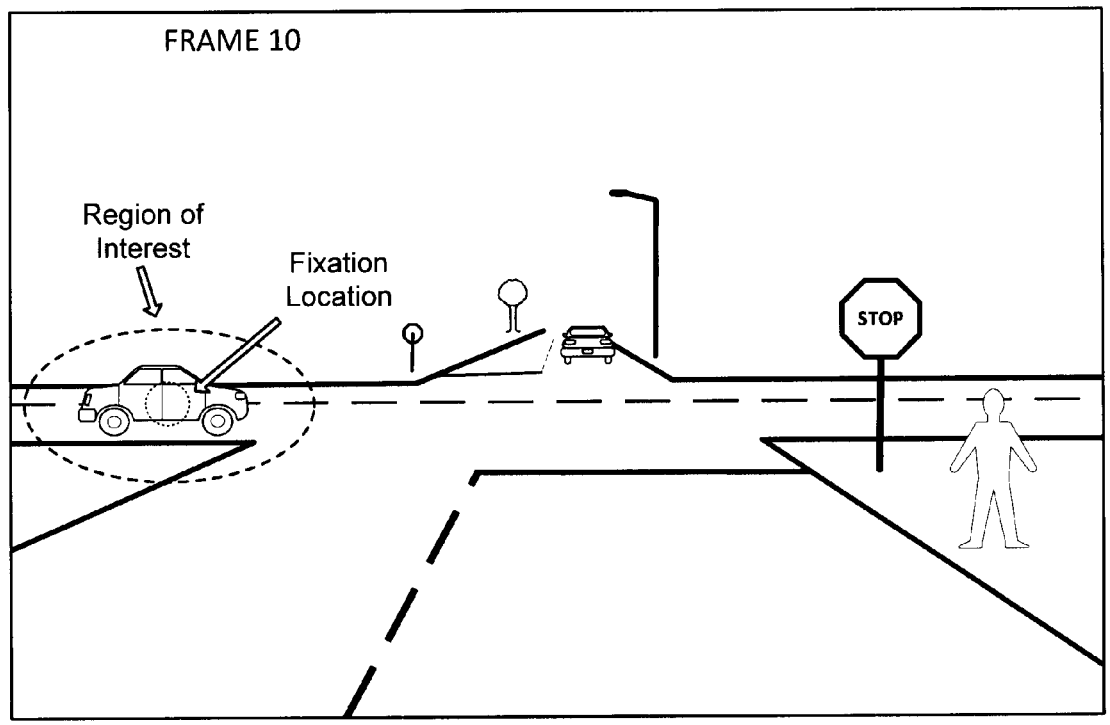

FIGS. 10-11 show an example of segmenting objects located within frames of video data. In this example, frames 10 and 15 are selected as frames between times $t_1$ and $t_2$. As shown in FIG. 10, the fixation location of the user's gaze is a circle positioned on a car, and the region of interest is defined as a square around the fixation location. Frames 10 and 15 are segmented with the region of interest located at a same position. Alternative regions of interest are shown in FIGS. 12-13, which respectively illustrate a circular region of interest and an elliptical region of interest for frame 10.

Figure 14:
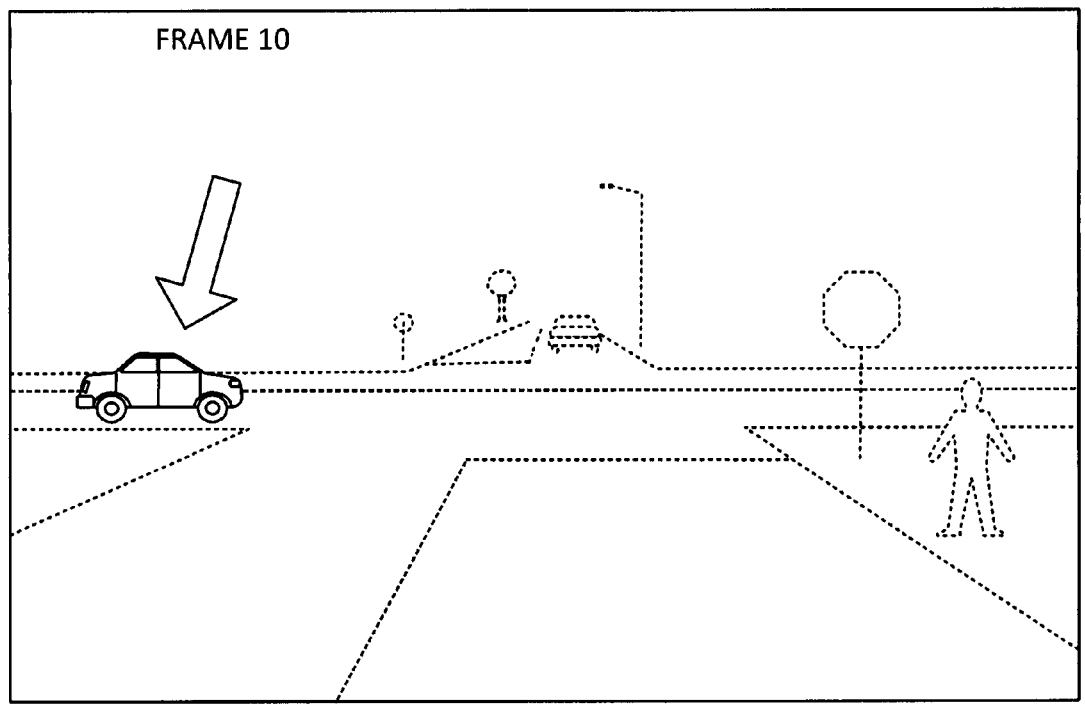
FIGS. 14-15 illustrate objects identified in the examples of FIGS. 10-11.
Figure 15:
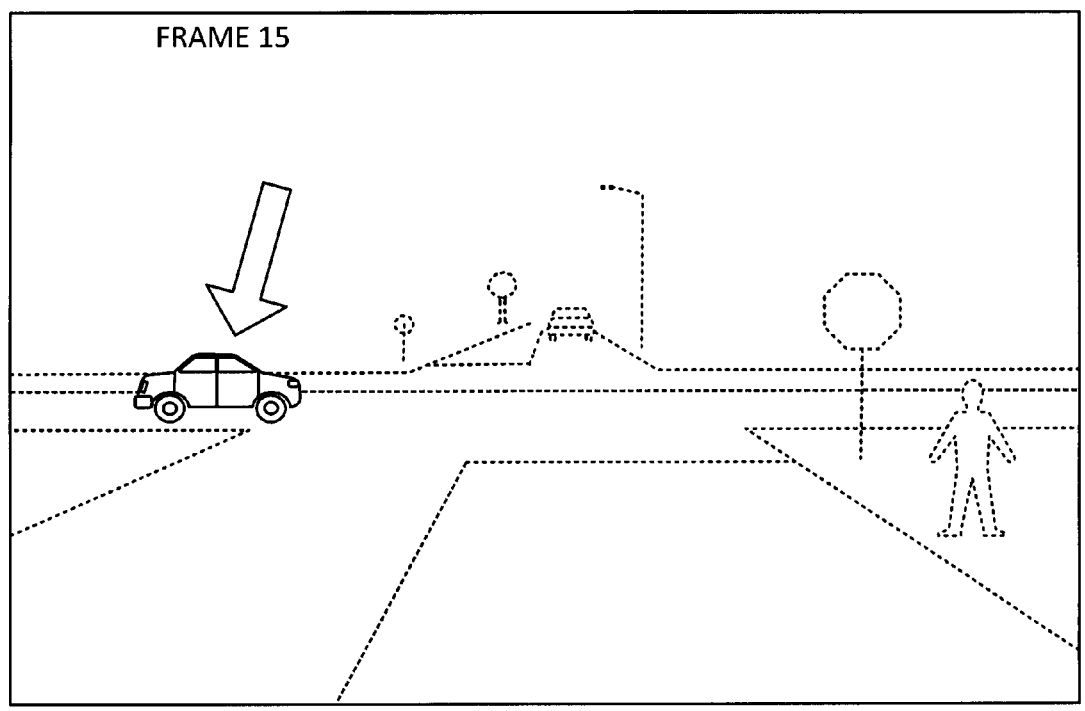

Based on the region of interest of frame 10, the car located therein is segmented (e.g., identified). A visual representation of this segmentation for frame 10 is shown in FIG. 14, which illustrates the car (identified by an arrow) as an identified object, while the other features displayed are ignored. A visual representation of the segmentation for frame 15 is shown in FIG. 15.

Figure 16:
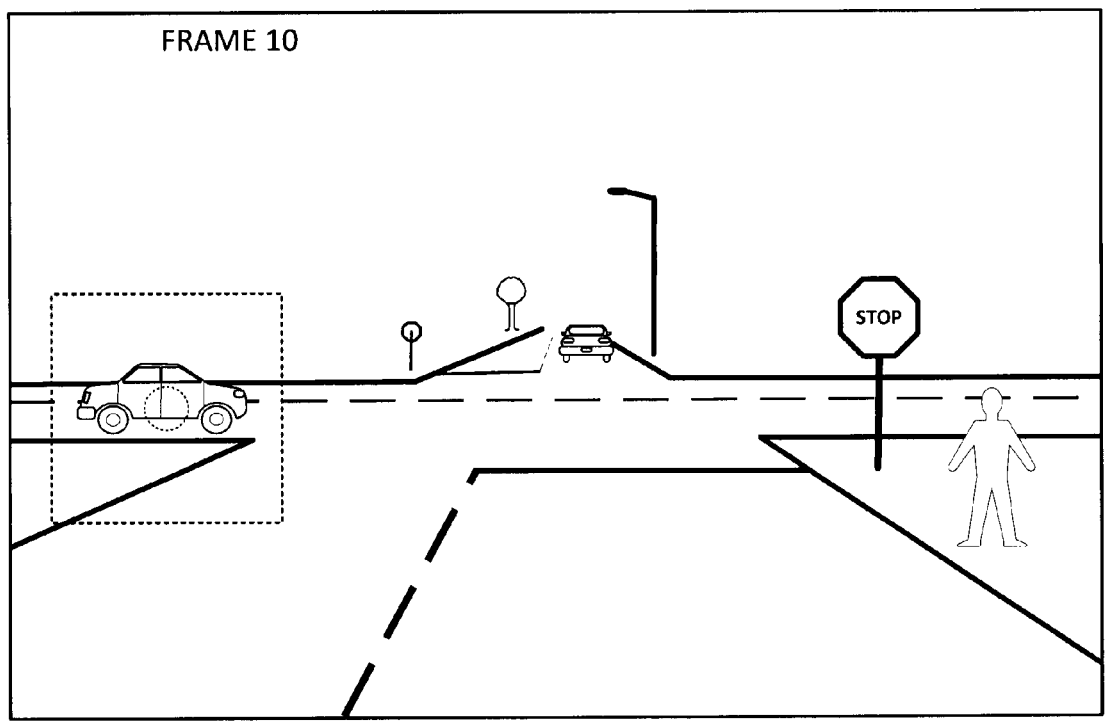
FIGS. 16-17 illustrate a second example of performing segmentation at a traffic intersection.
Figure 17:
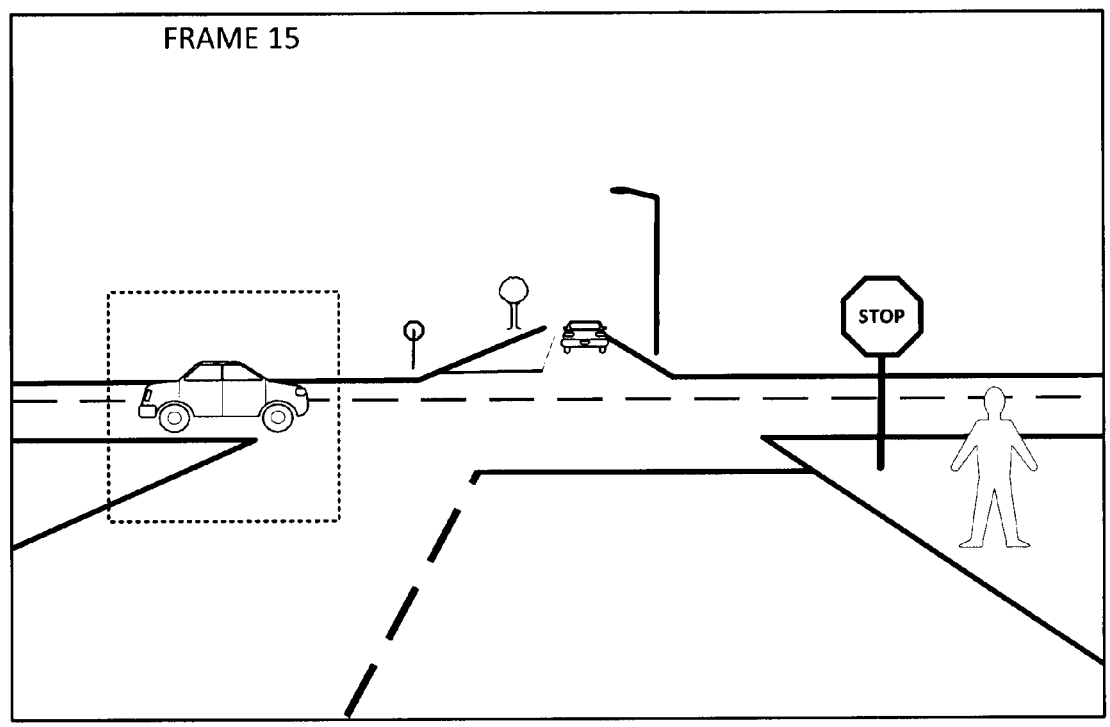

In an alternative embodiment, segmenting is performed on a first frame with the region of interest located at a first position and is performed on a second frame with the region of interest located at a second position, as shown in FIGS. 16-17. In this example, the region of interest is moved from a first position associated with a first fixation location to a second position associated with a second fixation location. In other words, the location of the region of interest is adjusted in accordance with the movement of the user's gaze (i.e. the movement of the identified car).

Figure 18:
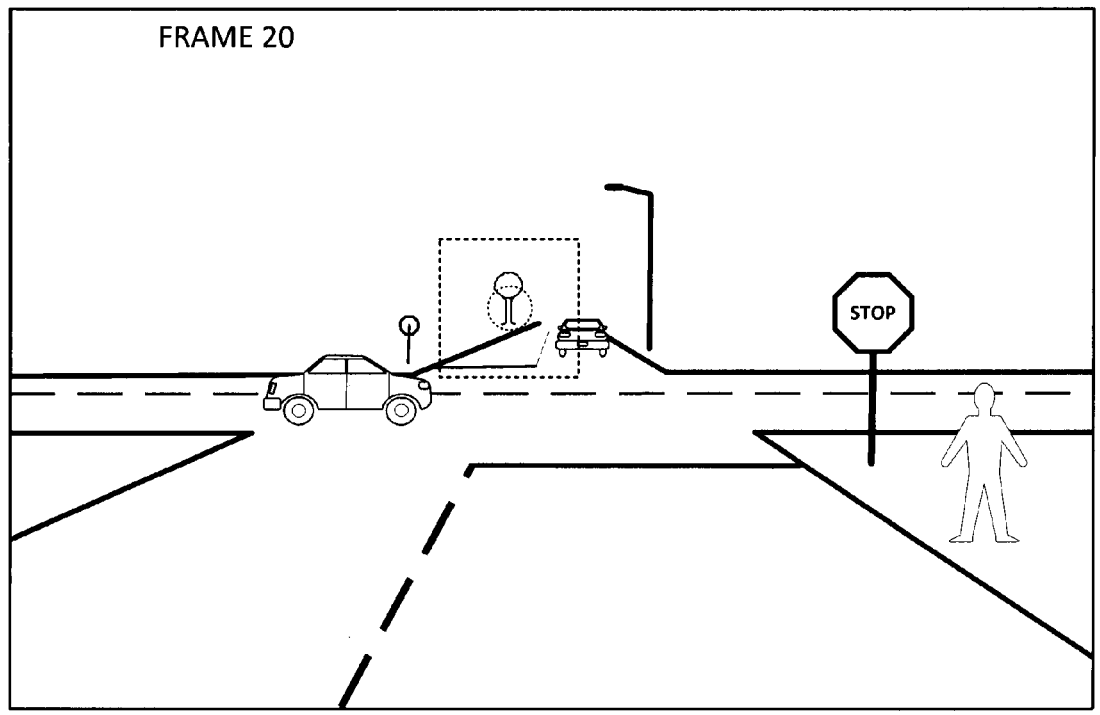
FIGS. 18-19 illustrate a third example of performing segmentation at a traffic intersection.
Figure 19:
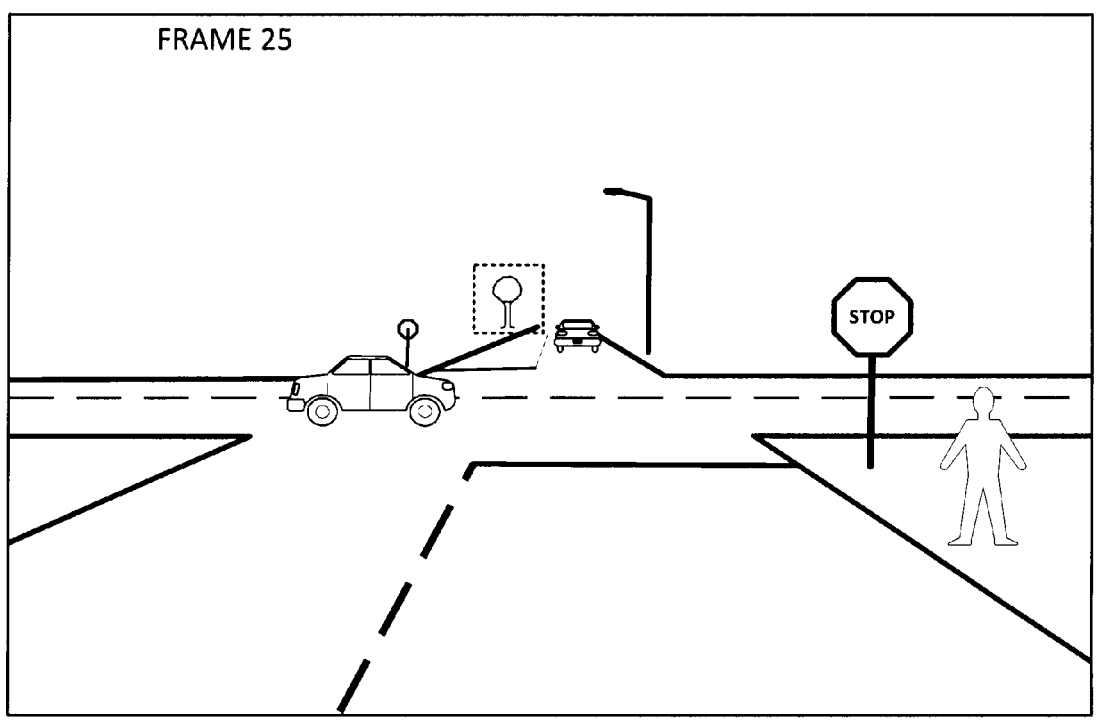

FIGS. 18-19 illustrates an example of segmenting a frame 25 with a region of interest which has been reduced in size based on a size of an object segmented in a frame 20. As shown in FIG. 18, frame 20 is segmented with the region of interest substantially larger than a tree, which is an object identified and recognized as the result of segmenting frame 20. After the segmentation system 100 performs segmentation to segment the tree, the area of the region of interest is adjusted such that frame 25 is segmented with the region of interest having an area based on the size of the tree, as shown in FIG. 19. In other words, the area of the region of interest used to segment frame 25 is reduced based on the size of the tree determined in segmenting frame 20.

Figure 20:
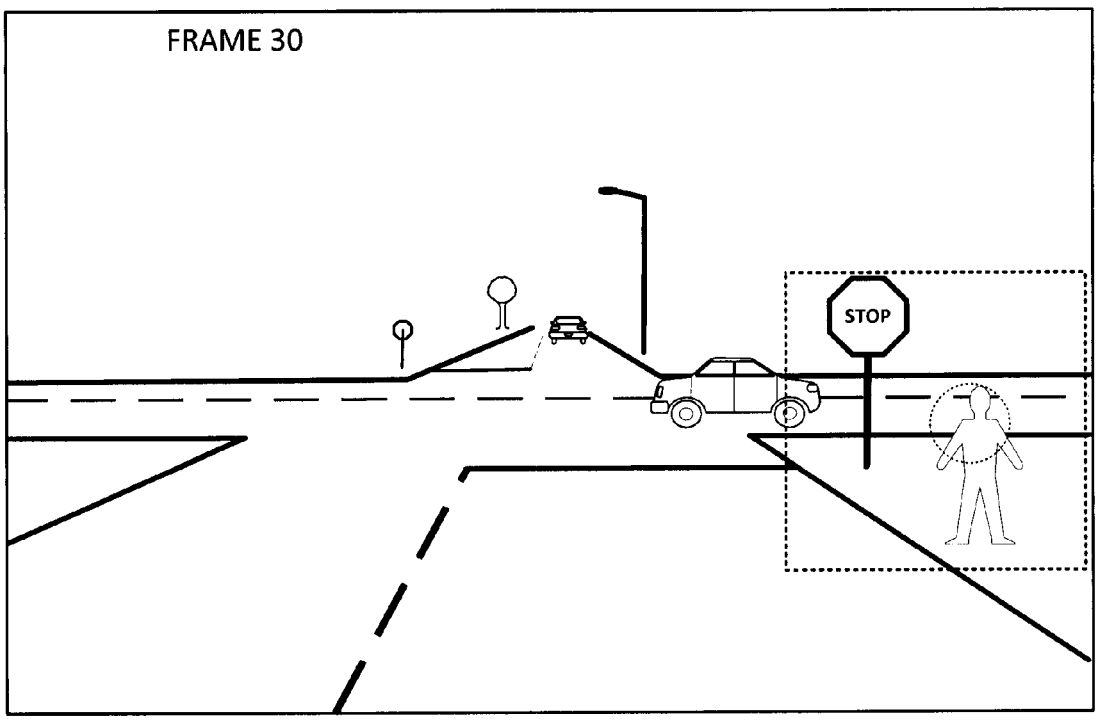
FIGS. 20-21 illustrate a fourth example of performing segmentation at a traffic intersection.
Figure 21:
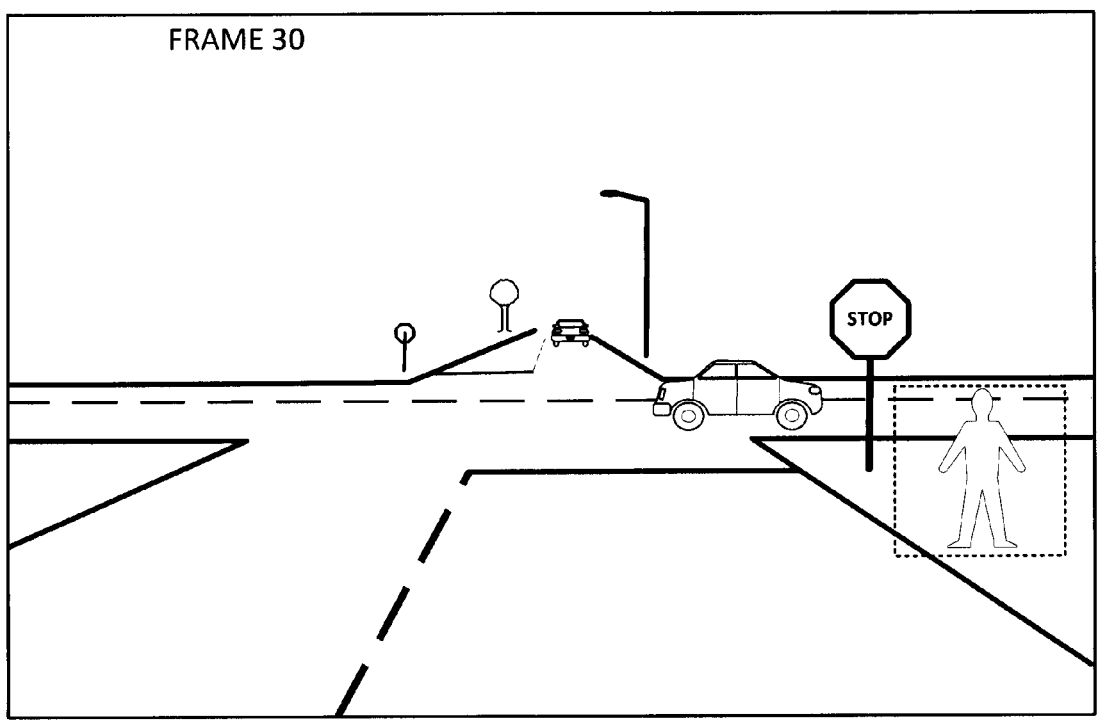

FIGS. 20-21 show an example of segmenting a frame 30 a first time with a region of interest having an initial area and segmenting the frame 30 a second time with a region of interest having a reduced area. In this example, the task of identifying pedestrians is specified to the user (which may be a part of the above-discussed safe driving task) and segmentation is complete when the segmented object from the frame 30 is determined to be relevant to the segmentation task or when a predetermined number of times have passed. As such, a process of adjusting the size of the region of interest can be implemented based on identifying appropriate objects (i.e. pedestrians).

As shown in FIG. 20, a first segmentation process is performed on the frame 30 with the region of interest surrounding both the stop sign and pedestrian. In this case, the first segmentation process segments the stop sign, and it is determined that the stop sign is not relevant to the task of identifying pedestrians.

As a result, as shown in FIG. 21, a second segmentation process is performed on the frame 30 with the region of interest having a reduced size to eliminate the object not relevant to the task (i.e. the stop sign) so that the region of interest only surrounds the pedestrian. That is, the second segmentation process segments the pedestrian, and it is determined that the pedestrian is relevant to the task of identifying pedestrians, thus ending the segmentation process for frame 30.

The segmentation system 100 can be implemented with fixation locations of multiple users. For example, in one aspect of the disclosure, the segmentation is performed on the frames with the use of fixation locations obtained from a first user, and thereafter segmentation is performed on the frames with the use of fixation locations obtained from a second user. The resulting segmentations are then analyzed and an average result is output. As such, objects segmented in both segmentations can be identified as an average segmentation result, and the segmentation process becomes more accurate.

In the case of safe driving, one aspect of this disclosure includes building improved driver gaze models with the output of the segmentation process. By recording gaze in corresponding driving situations, implicit relational information is accumulated which may be useful to model gaze patterns and transfer knowledge from more experienced drivers to less experienced ones. For example, the segmentation system may associate gaze patterns with driving situations, plans, and actions; store these in memory; and replay these on demand. As such, a less experienced driver could learn how a more experienced driver responds in a given driving situation by viewing a segmented video prepared based on the more experienced driver's gaze. Accordingly, this provides various educational benefits.

Although the above descriptions have been provided based on video data, it should be appreciated other spatiotemporal data can be utilized, such as lidar (light detection and ranging) data. Also the lidar data can be coupled to video data, where a tracking camera can be used to track movements of a user's eyes in a video scene, and objects are segmented form corresponding lidar data. Further, gaze tracking can be performed in real time utilizing a gaze-tracking camera and lidar while a driver is driving a vehicle. Such an implementation could detect a position of a user's gaze based on predetermined geometrical data of a driver's position within the vehicle.

A lidar sensor obtains distance data by illuminating an object with light. This distance data can be used to set the size of the region of interest. For example, if the distance data indicates that an object is further away from the plane of the display screen, then the region of interest may be increased or decreased in area based on this distance.

Figure 22:
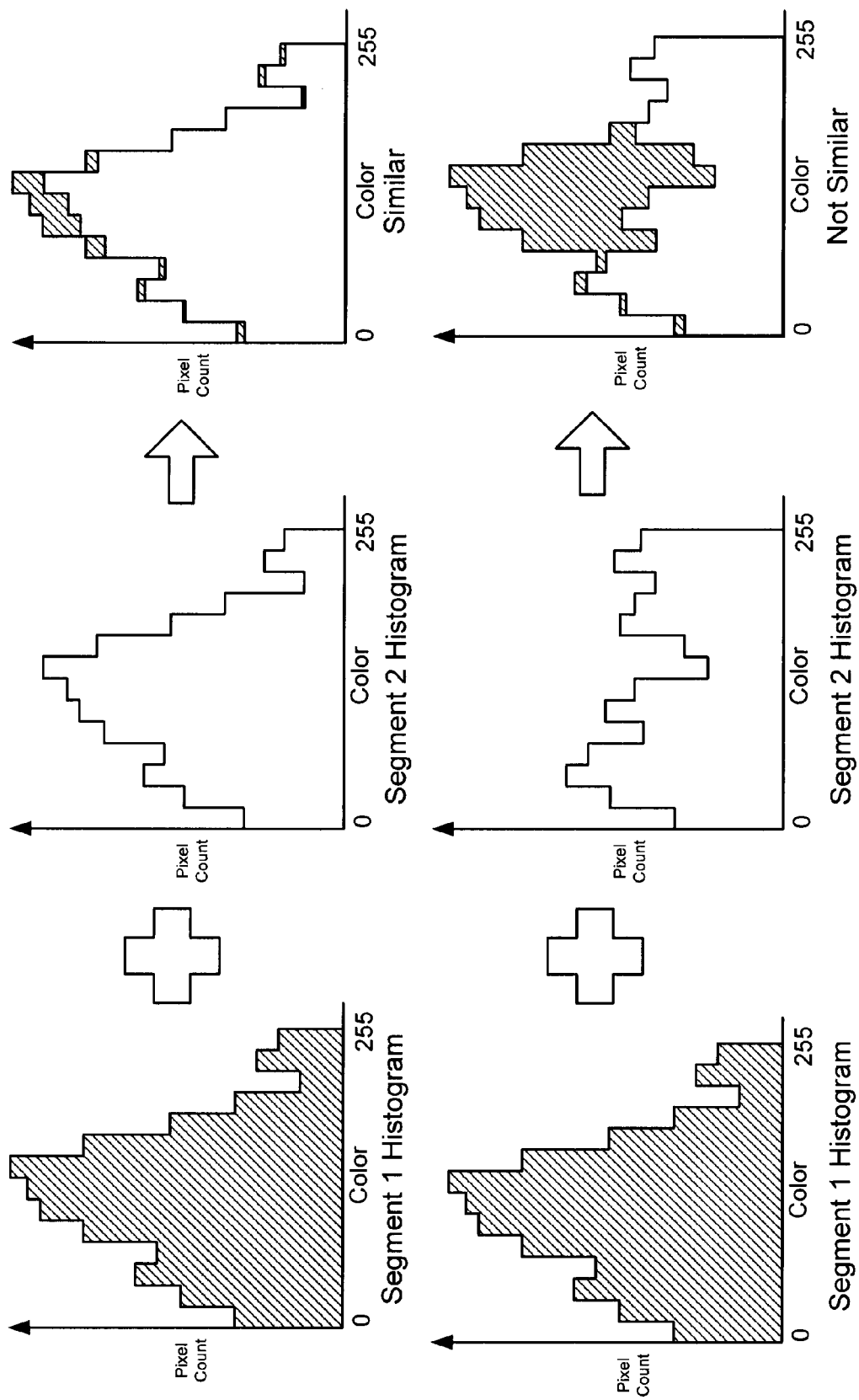

According to the above-described aspects, objects and segments can be compared based on similar visual representations. One such implementation can utilize histogram comparisons, as shown by example in FIG. 22. Here, a monochromatic comparison is shown merely for the purposes of description. It should be appreciated similar comparisons can be performed for a standard 3-color RGB spectrum. The top comparison shows how two segments, such as two different segments of two different frames or a segment from one frame and a segment stored in a database used for object-recognition, can be determined as similar. Here, the histograms show similar trends and within a preset range of one another.

On the other hand, the lower comparison illustrates two segments which are not similar. That is, their histograms have dissimilar trends and have large disparities, making it very unlikely the two segments represent the same object. Similar comparisons can be made with point cloud data from, e.g., a lidar source, where outlines of objects are compared.

Obviously, numerous modifications and variations of the present disclosure are possible in light of the above teachings. It is therefore to be understood that within the scope of the applied claims, the invention may be practiced otherwise than as specifically described herein.

The invention claimed is:

1. A segmentation apparatus, comprising:
   a receiving unit configured to receive gaze data generated by monitoring eye movements of a user viewing spatiotemporal data as a plurality of frames, the gaze data including fixation locations based on the user's gaze throughout the frames;
   a selection unit configured to select a first frame and a second frame of the frames based on the fixation locations;
   a segmentation unit configured to perform segmentation on the first and second frames to segment first and second objects, respectively, from the first and second frames based on a region of interest associated with the first and second frames, the region of interest corresponding to a location of one of the fixation locations;
   a determining unit configured to determine whether the first and second objects are relevant to a segmentation task specified to a user; and
   a generation unit configured to generate association data to associate the first object with the second object when the first and second objects are determined to be relevant to the segmentation task.

2. The apparatus according to claim 1, wherein:
   the receiving unit is configured to receive the gaze data including a plurality of fixation location candidates, each including a time duration, the time duration indicating a duration of the user's gaze, and
   the fixation locations are the fixation location candidates having a time duration which is longer than a threshold value.

3. The apparatus according to claim 2, wherein the first and second frames are frames which were displayed during the time duration of one of the fixation locations.

4. The apparatus according to claim 2, wherein:
   an area of the region of interest is determined by the time duration of the fixation location, and
   the area of the region of interest decreases as the time duration of the fixation location increases.

5. The apparatus according to claim 1, wherein the segmentation unit is configured to perform the segmentation by:
   segmenting the first frame with the region of interest located at a first position, and
   segmenting the second frame with the region of interest located at a second position, the second position being a position that is different than the first position.

6. The apparatus according to claim 5, wherein:
   the fixation locations include first and second fixation locations, and
   the first position corresponds to a position of the first fixation location and the second position corresponds to a position of the second fixation location.

7. The apparatus according to claim 1, wherein the segmentation unit performs the segmentation by segmenting the first and second frames with the region of interest located at a same position.

8. The apparatus according to claim 1, wherein the segmentation unit performs the segmentation by adjusting an area of the region of interest used to segment the second frame such that the area of the region of interest used to segment the second frame is smaller than an area of the region of interest used to segment the first frame.

9. The apparatus according to claim 1, wherein the segmentation unit performs the segmentation by adjusting an area of the region of interest used to segment the second frame such that the area of the region of interest used to segment the second frame is based on a size of the first object.

10. The apparatus according to claim 1, wherein the segmentation unit performs the segmentation by:
  reducing the region of interest of the first frame from an initial area to a reduced area in response to the determining unit determining the first object is not relevant to the segmentation task; and
  segmenting the first frame to segment a third object based on the region of interest having the reduced area in response to the determining unit determining the first object is not relevant to the segmentation task.

11. The apparatus according to claim 1, wherein:
  the segmentation unit performs segmentation by applying an object recognition algorithm to the first and second frames, and
  the generating unit generates the association data based on an output of the object recognition algorithm, the output of the object recognition algorithm including a type or class and location data of the first and second objects.

12. The apparatus according to claim 1, wherein the plurality of frames are generated from data provided by lidar or another time-of-flight type sensor.

13. The apparatus according to claim 1, wherein:
  the segmentation unit performs segmentation by analyzing features of the first and second objects to identify a type or class of the first and second objects, respectively, and
  the determining unit determines the first and second objects are relevant to the segmentation task when each type or class of the first and second objects is identified as a predetermined type or class associated with the segmentation task.

14. A segmentation apparatus, comprising:
  means for receiving gaze data generated by monitoring eye movements of a user viewing spatiotemporal data as a plurality of frames, the gaze data including fixation locations based on the user's gaze throughout the frames;
  means for selecting a first frame and a second frame of the frames based on the fixation locations;
  means for performing segmentation on the first and second frames to segment first and second objects, respectively, from the first and second frames based on a region of interest associated with the first and second frames, the region of interest corresponding to a location of one of the fixation locations;
  means for determining whether the first and second objects are relevant to a segmentation task specified to a user; and
  means for generating association data to associate the first object with the second object when the first and second objects are determined to be relevant to the segmentation task.

15. A method, comprising:
  specifying a segmentation task to a user;
  receiving gaze data generated by monitoring eye movements of the user viewing spatiotemporal data as a plurality of frames, the gaze data including fixation locations based on the user's gaze throughout the frames;
  selecting a first frame and a second frame of the frames based on the fixation locations;
  performing segmentation on the first and second frames to segment first and second objects, respectively, from the first and second frames based on a region of interest associated with the first and second frames, the region of interest corresponding to a location of one of the fixation locations;
  determining whether the first and second objects are relevant to the segmentation task; and
  generating association data to associate the first object with the second object when the first and second objects are determined to be relevant to the segmentation task.

16. A non-transitory computer readable medium encoded with instructions which, when executed by a processor, cause the processor to execute a method comprising:
  specifying a segmentation task to a user;
  receiving gaze data generated by monitoring eye movements of the user viewing spatiotemporal data as a plurality of frames, the gaze data including fixation locations based on the user's gaze throughout the frames;
  selecting a first frame and a second frame of the frames based on the fixation locations;
  performing segmentation on the first and second frames to segment first and second objects, respectively, from the first and second frames based on a region of interest associated with the first and second frames, the region of interest corresponding to a location of one of the fixation locations;
  determining whether the first and second objects are relevant to the segmentation task; and
  generating association data to associate the first object with the second object when the first and second objects are determined to be relevant to the segmentation task.

* * * * *